US006275741B1

(12) United States Patent
Choi (10) Patent No.: US 6,275,741 B1
(45) Date of Patent: Aug. 14, 2001

(54) INTEGRATED CONTROL PLATFORM FOR INJECTION MOLDING SYSTEM

(75) Inventor: Christopher Choi, Richmond Hill (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/166,738

(22) Filed: Oct. 5, 1998

(51) Int. Cl.[7] .................................................. B29C 45/00
(52) U.S. Cl. ............................................. 700/200; 700/10
(58) Field of Search .................................. 700/200–205, 700/2, 10; 264/40.1

(56) References Cited

U.S. PATENT DOCUMENTS

| 4,124,887 | * | 11/1978 | Johnson et al. | 700/9 |
| 5,176,858 | * | 1/1993 | Tsukabe et al. | 264/40.1 |
| 5,223,191 | * | 6/1993 | Tatsuno et al. | 264/40.1 |
| 5,229,952 | * | 7/1993 | Galloway et al. | 700/200 |
| 5,470,218 | * | 11/1995 | Hillman et al. | 425/144 |
| 5,795,511 | * | 8/1998 | Kalantzis et al. | 264/40.6 |
| 5,978,578 | * | 11/1999 | Azarya et al. | 717/1 |
| 6,007,227 | * | 12/1999 | Carlson | 700/67 |

* cited by examiner

Primary Examiner—Paul P. Gordon
Assistant Examiner—Zoila Cabrera
(74) Attorney, Agent, or Firm—Katten Muchin Zavis (57) ABSTRACT

Apparatus and method for controlling an injection molding system having a plurality of devices which generate a corresponding plurality of feedback signals includes structure and steps for providing an operator control station which has a display and at least one operator input device. A single, general-purpose computer is coupled to both the operator control panel and the plurality of injection molding devices and functions to perform multiple-tasking control of both the injection molding functions and the operator control functions. The computer preferably performs real-time closed loop control of the plurality of injection molding devices while also processing system feedback signals and operator input signals. Thus, there is no need for the analog signal processor and the programmable logic controller of the prior art. Preferably, the single general purpose computer has local area network and internet connections to allow external control and feedback of the operating parameters of the injection molding system.

43 Claims, 4 Drawing Sheets

INTEGRATED CONTROL PLATFORM FOR INJECTION MOLDING SYSTEM

BACKGROUND OF THE INVENTION

1. Field of the Invention

The present invention relates to an integrated control platform for controlling an injection molding system, and more particularly to apparatus and method for controlling an injection molding system with a single, general purpose computer which performs both the machine-control functions and the human machine interface (HMI) functions. This control architecture thus obviates the need for the analog signal processor and the programmable logic controller used in the prior art.

2. Description of the Related Art

Injection molding systems are widely used for producing great quantities of inexpensive plastic products such as plastic PET preforms which can be blown into the widely-recognized drink containers. Such injection molding systems typically include a plurality of analog and digital devices which carry out the injection molding operations. For example, extruder drives, proportional flow control valves, electric drives, heating and cooling elements, and other electro-hydro-mechanical and electro-mechanical drives are analog devices which perform injection molding functions in a well-known way. Examples of digital devices include proximity switches, clamp pressure limit transducers, digital solenoid valves, etc. Each of these analog and digital devices must not only be controlled with appropriate analog and digital commands, but they are typically provided with feedback sensors which output analog and/or digital feedback signals so that the various devices may be properly controlled to produce high-volume, quality output from the system. For example, the feedback signals may be used in closed loop control to effect real-time changes in the injection molding devices (e.g. temperature set points, injection pressure, etc.). Also, the feedback signals may be used to display operational information (e.g. status, temperature, parts count, etc.) to the operator at the human machine interface or operator control panel.

In the prior art, it was necessary to utilize an analog signal processor (ASP) to provide for real-time control of the various analog devices in the injection molding system. Likewise, it was necessary to provide a programmable logic controller (PLC) to control the various digital devices in the injection molding system. See, for example, U.S. Pat. No. 5,062,052 (incorporated herein by reference) for an example of a known injection molding system utilizing both an ASP and a PLC to control the injection molding machine. While the '052 Patent discloses a general purpose computer, its use is restricted to interfacing between the PLC and the HMI. Both the PLC and the ASP are still required to perform the injection molding operations.

The known injection molding control architecture is limited in that reconfiguration of the injection molding devices cannot be done in real time. Each of the ASP and PLC must be modified or reprogrammed to effect the change. Thus, incorporating new technologies in an injection molding system often requires that the entire system be shut down for reconfiguration. Additionally, the operational status of each injection molding system may only be ascertained at the HMI of each system. Also, injection molding machine manufacturers typically utilize proprietary architecture in their PLC's, thus limiting the variety of new processing techniques than can be applied to such machines. Furthermore, using multiple layers of ASP and PLC processing control imposes a processing penalty and a bottleneck which reduces the speed at which machine changes can be accomplished.

Thus, what is needed is a new injection molding control architecture which provides true real-time control of the injection molding system, allows rapid reconfiguration of system devices, permits the use of readily available off-the-shelf software, and allows system status and control information to be transmitted beyond the system, e.g., to the factory office or even corporate headquarters.

SUMMARY OF THE INVENTION

An object of the present invention is to provide an injection molding control architecture that enables state-of-the-art hardware and software components to be seamlessly integrated into one controller. Another object is to provide such a control architecture that provides true real-time controlling and networking capabilities. Yet another object is to provide an open control architecture that allows easy integration of ancillary equipment and expansion of machine functions. An additional object is to provide intelligent system diagnostics and remote access capabilities to reduce system downtime and to import/export knowledge and information to/from external sources. Yet another object is to provide, in one general purpose computer, injection molding system control functions, human-machine interface functions, motion control functions, sequence logic functions, continuous process control functions, and communication networking functions.

Additional objects of the present invention include providing a standard application programming interface, supporting external communications (such as electronic mail, paging, etc., for supervision, trouble-shooting, and information. exchange between the system and plant management), providing an expert system with embedded process knowledge to assist in system and process set up, providing intelligent alarm management and system diagnostics, and providing predefined templates with embedded options to assist the user in setting up and operating the injection molding system.

The above objects and other advantages according to the present invention may be achieved by an apparatus for controlling an injection molding system which has a plurality of devices that generate a plurality of feedback signals, the apparatus including (i) a human machine interface preferably disposed adjacent the injection molding system and having a display and at least one operator input device, and (ii) a general purpose computer coupled to both the human machine interface and to the plurality of injection molding devices, wherein the general purpose computer performs real-time closed loop control of the plurality of injection molding devices based on the plurality of command and feedback signals.

According to another aspect of the present invention, a single computer for controlling an injection molding system having a plurality of injection molding devices which carry out injection molding processes and provide feedback signals, and a human machine interface having a display and at least one manual input device for inputting operator commands, includes (i) a first input/output for receiving command signals from the human machine interface manual input device or devices, and for providing display signals to the human machine interface display, (ii) a second input/output for receiving the feedback signals directly from the plurality of injection molding devices, and for providing real-time control signals directly to the plurality of injection molding devices, and (iii) a CPU for generating the real-time control signals in accordance with the feedback signals and the command signals, the CPU performing multi-tasking processing of the command signals, the display signals, the feedback signals, and the control signals.

Another aspect of the present invention features an injection molding system which comprises (i) a plurality of injection molding devices for performing injection molding operations, the plurality of devices receiving real-time control signals and outputting real-time feedback signals, (ii) a human machine interface having a display and at least one operator input device, and (iii) a single processor which receives the real-time feedback signals from the plurality of injection molding devices and command signals from the operator input device, multi-task processes the received signals in accordance with a plurality of predetermined injection-molding control programs and display programs, outputs the real-time control signals to the plurality of injection molding devices and outputs the display signals to the human machine interface display in accordance with the plurality of predetermined injection-molding control programs and display programs, and has an operating system which is capable of running commercial software.

In accordance with another aspect of the present invention, a method of controlling an injection molding machine which has a plurality of injection molding devices that perform injection molding processes and provide feedback signals, and a human machine interface with a display and at least one operator input device, includes the steps of (i) inputting to a single processor the feedback signals and signals from the operator input device or devices, and (ii) using the single processor to control, in real-time, both the plurality of injection molding devices and the control panel display.

A further aspect of the present invention features at least one computer-readable storage medium for storing computer-readable data which causes a single general purpose computer to control an injection molding system which has a plurality of injection-molding devices that perform injection molding operations and produce a plurality of feedback signals, and a human machine interface having a display and at least one operator input device, the computer-readable storage medium causing the single general purpose computer to (i) receive the feedback signals and signals from the human machine interface operator input device or devices, and (ii) perform multi-task processing to control both the plurality of injection molding devices and the human machine interface in real-time, the multi-tasking processing performing human machine interface functions with lower priority in the "background" and injection molding device functions with higher priority in the "foreground".

BRIEF DESCRIPTION OF THE DRAWINGS

The present invention is described in conjunction with the accompanying drawings in which.

DETAILED DESCRIPTION OF THE PREFERRED EMBODIMENTS

1. Introduction

The advantageous features of the present invention will be described with respect to the plastic injection molding system or machine to be described below. However, the invention is not limited to such embodiments, but may be applied to any injection molding technology within the scope of the attached claims.

The control architecture according to the present invention provides both real-time control of the injection molding system and real-time interface with the operator controls. The architecture also includes the human machine interface (HMI) required for the operation and monitoring of the injection molding system, as well as an interface to the factory and corporate headquarters for information exchange. Software and hardware are integrated to convert a general purpose computer into a system controller which not only controls the machine functions and the operator controls, but has an open architecture to enable easy integration of any ancillary equipment and information exchange with external systems and networks. In addition, the general purpose computer is extended, by additional hardware and software, to provide deterministic real-time control of an injection molding system to achieve high performance and intelligent manufacturing cells.

Thus, the flexible and reconfigurable manufacturing system according to the present invention can easily adapt new technologies and processes, extending critical, real-time performance data beyond the human machine interface on the factory floor to other plant departments and corporate headquarters to provide real-time information to all branches of the organization. The use of commercial, general purpose computer (PC) technologies allows the use of better and faster CPU's, more robust operating systems, many different peripherals, a wide range of communications and network capabilities, and the ability to extend the control of the machine from the factory floor to a remote site.

2. The Injection Molding System Control Architecture

Figure 1:
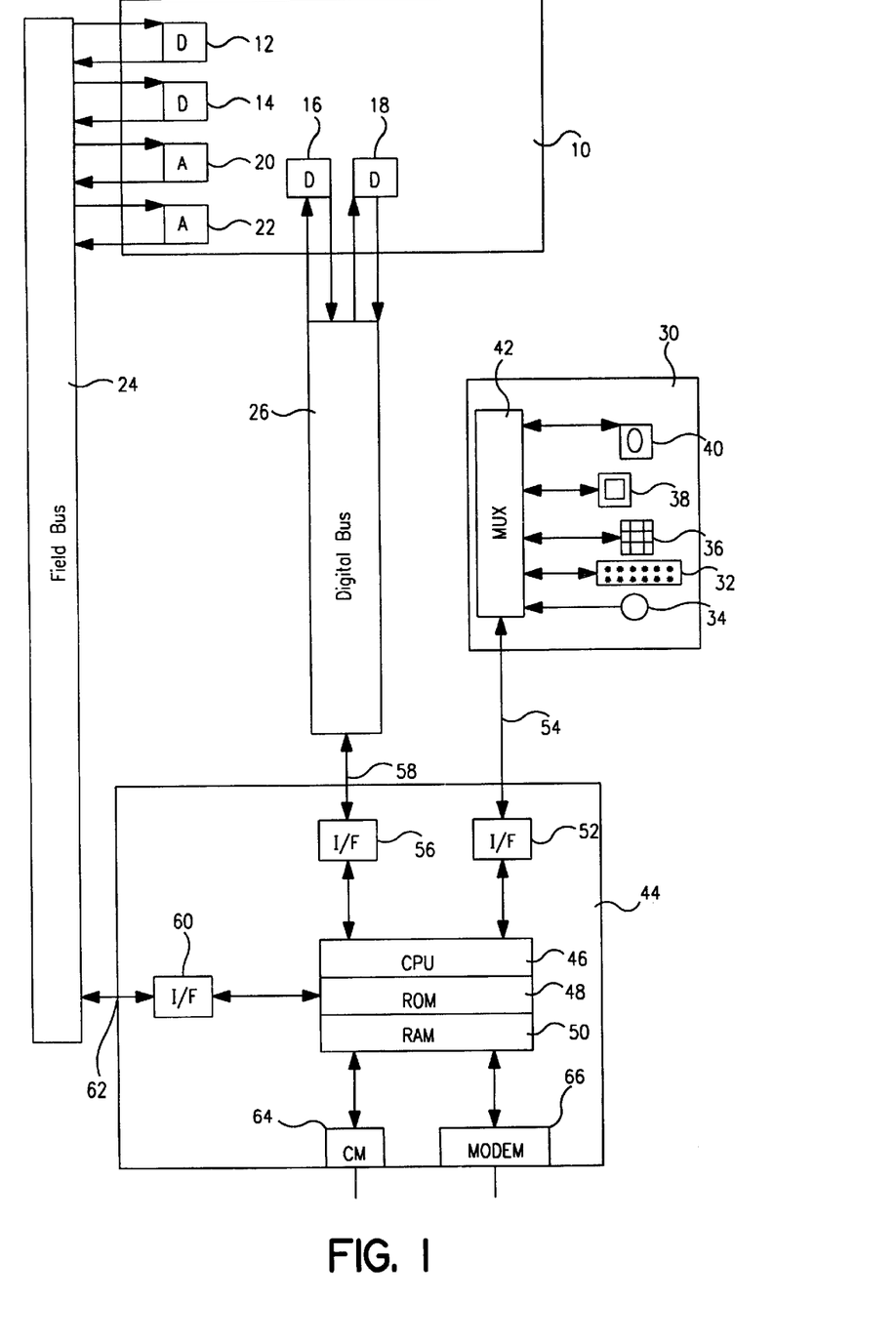
FIG. 1 is a schematic block diagram of an injection molding system in accordance with the present invention.

FIG. 1 is a schematic block diagram showing the general features of the injection molding system control architecture according to the present invention. In FIG. 1, an injection molding system or machine 10 carries out injection molding processes utilizing digital devices 12, 14, 16, and 18, and analog devices 20 and 22, in a well-known manner. Each of the digital and analog devices preferably includes an input for driver control and an output which provides feedback signals used in closed loop control of the device. Digital devices 12, 14, and analog devices 20, 22 preferably receive control signals from, and output feedback signals to, field bus 24 (to be described below); while the digital devices 16 and 18 receive control signals from, and output feedback signals to, digital bus 26 (to be described below). Of course, depending on the particular injection molding system being controlled, either the field bus 24 or the digital bus 26 may carry all necessary control and feedback signals to control the injection molding process.

A human machine interface (or control panel or station) 30 is used by the operator to input control data and to view process feedback information. The HMI 30 has a keyboard 32 and a pointing device (such as a mouse) 34 which are used by the operator to input data. A system function keypad (which may include an LED display) device 36 may also be used by the operator to input specific machine commands, depending upon the system to be controlled. A display 38 provides the operator with at least one viewing device for observing a display based on feedback signals, and provides an interface for manually-input data. A removable storage device drive 40 (such as a floppy disk drive) may also be located at the control panel 30 for the operator to input programmed control information, new control programs, or to download feedback data to a removable storage device. The control panel 30 also includes a multiplexer 42 (to be described below) which multiplexes the various control and feedback data between the HMI 30 and the general purpose computer 44.

The general purpose computer 44 is preferably an off-the-shelf personal computer having a CPU 46, a ROM 48, and a RAM 50. Preferably, the computer 44 includes a control panel interface 52 which is coupled to the multiplexer 42 of the HMI 30 through a bi-directional, greater than 1 Gigabit per second serial bus link 54 (to be described below). The interface 52 is preferably a Beckhoff Industrial Electronics CP-Link PC Multiplexer. While not shown, the general purpose computer 44 may be equipped with such peripherals as a CRT, a keyboard, a disk drive, a CD-ROM drive, a mouse, a touch screen, a light pen, etc.

The computer 44 also has a digital interface 56 which is coupled to the digital bus 26 through a connection 58. Likewise, the computer 44 has an interface 60 which is coupled to the field bus 24 through a connection 62.

The computer 44 also includes a local area network interface 64 which may be coupled to a local area network (e.g., Ethernet; not shown) used within the factory. Also, the computer 44 may include a modem or other external interface 66 which may be used to connect the computer 44 to, e.g., the internet or an intranet.

With the structure described above, the control architecture according to the present invention can conduct true real-time, closed loop control of the injection molding devices 12–22 without the need of a PLC or an ASP, as were required in the prior art. Additionally, the operator can control the injection molding process from the HMI 30 through the computer 44. The computer 44 has sufficient processing speed and power to multi-task process both the injection-molding functions and the HMI functions. For example, the computer 44 may process instructions for the high-priority closed-loop controlled injection molding devices in foreground, while processing instructions for the lower-priority HMI functions in background. Thus, the computer 44 will interleave processing of machine control functions and HMI functions.

3. The General Purpose Computer

As noted above, the single, general purpose computer according to the present invention includes a hardware architectures similar to that of a standard, general purpose commercial or industrialized personal computer, and preferably operates under a general-purpose operating system such as Windows NT(™). Preferably, the computer 44 is a Model C6150 Industrial PC from Beckhoff Industrial Electronics. This PC features a Pentium II microprocessor with a 2.0 Gigabyte (or higher) hard drive, and a 64K RAM memory. The computer may also be equipped with a CD ROM drive, 1.44K and/or 120 MB disk drives, four serial interfaces, a printer interface, and several (e.g. seven) slots for additional cards. Interfaces for local area networks and/or internet/intranet connectivity are preferably installed in the extra slots. The computer is capable of simultaneously multi-tasking at least three functions, i.e., control of the injection molding system, control of the HMI, and serving as a plant-wide network server.

The computer 44 performs A/D and D/A functions in order to receive the analog feedback signals and provide analog control signals through the field bus 24. Thus, the computer 44 processes all control programs, HMI programs, and network programs in the digital regime. By operating in the digital regime, the computer 44 provides better performance and more accurate solutions than traditionally offered by analog circuitry. The high computation power and generous working memory size of the computer 44, together with a software real-time extension kernel (to be described below) provides real-time performance for machine control, HMI functions, and network functions. Since the real-time extension kernel operates on microsecond resolution, the computer 44 operates as a multi-tasking scheduler for all computer functions. That is, the computer 44 may simultaneously control all of the injection molding devices using multi-tasking processing. Additionally, such machine control functions can be multi-tasked together with the HMI functions and/or the network functions. The system is capable of achieving injection molding device control loop updates on the order of milliseconds, which renders the use of an analog closed loop controller for real-time control of the injection molding devices unnecessary.

Thus, the computer 44 can control the injection molding devices using a plurality of predetermined device-control programs, (e.g., resin injection, mold clamp operation, etc.), and also controls the HMI 30 utilizing a plurality of predetermined HMI programs (e.g., display, keyboard, mouse, keypad, etc.). The computer 44 also networks with other computing devices through a local area network (and/or the internet) utilizing a plurality of predetermined programs such as internet browsers, word processing programs, spreadsheet programs, etc. Not only does the computer 44 operate a plurality of such control and networking programs, it can do so in real-time by multi-tasking the processing in accordance with a predetermined priority, such as critical injection molding devices first, feedback and status devices second, MHI devices third, and network communication functions last. Moreover, the open architecture of the computer 44 allows any of these predetermined control and networking programs to be modified, upgraded, installed, or changed, as required.

Not only does the computer 44 obviate the need for an ASP, it also replaces the PLC used at the prior art. The ability to easily install new application program software into the computer 44 provides a method of mapping process inputs/outputs to process images which can be displayed to the operator. The computer 44 is enabled with input and output capabilities as well as a real-time kernel extension to its general-purpose operating system and programming software, in accordance with an international industrial standard such as IEC 1131-3. Thus, the computer 44 replaces the commonly used PLC or proprietary controllers which control the operating sequences of various injection molding system devices to perform the required injection molding functions. In addition to acting as the master for controlling the machine functions, the computer 44 also acts as an information archive which concentrates all operational information of the machine devices and machine status which may then be transmitted to a factory supervisory system.

4. Real-Time Extension Kernel

As noted above, the computer 44 according to the present invention preferably runs a real-time extension kernel to the operating system such as Windows NT. This kernel permits more rapid multi-tasking processing of the machine functions, HMI functions, and network functions. Several commercial automation solution software packages are available which provide real-time processing for a general purpose computer. These real-time extension kernels allow for processing independence yet use the power development of a general purpose computer. The preferred embodiment uses the TwinCAT Real-time Kernel Extension developed by Beckhoff Industrial Electronics. The TwinCAT kernel extension offers a base for PLC and motion control solutions. The TwinCAT kernel is a run time system with real-time execution of programs, tools for programming, analysis tools, and configuration management functions. All Windows programs (e.g., visualization and Office products) may interact with TwinCAT via standard Microsoft interfaces to exchange data and control servers. Thus, the real-time kernel extension according to the present invention allows for multi-tasking processing, is completely integrated into the operating system, allows all standard features of the Windows NT Operating System to remain unchanged, allows the CPU capacity to be shared between control real-time tasks and NT by the user, and provides pure software solutions without further need for hardware.

5. Human Machine Interface

The HMI (or control panel or station) 30 is used to input control information to control the injection molding devices 12–22, and to receive feedback from those devices for display, storage, or transmission. The HMI 30 includes such standard control equipment as the keyboard 32, the pointing device (mouse) 34, the keypad 36, the removable storage device 40, the display 38, and the multiplexer 42. Preferably, the HMI 30 is a Beckhoff CP7000 series control panel having special PLC keys with LED displays, a touch screen, a 15 inch TFT display, a PC keyboard, a 3 and ½ inch disk drive, and a CP-Link interface.

In the present invention, the effectiveness of the communication between the HMI 30 and the computer 44 is greatly improved due to the integration of the operator interface and machine control functions into a single general purpose computer which eliminates the processing bottleneck normally imposed by the communication links between the HMI, the PLC, and the ASP, as used in the prior art.

Figure 2:
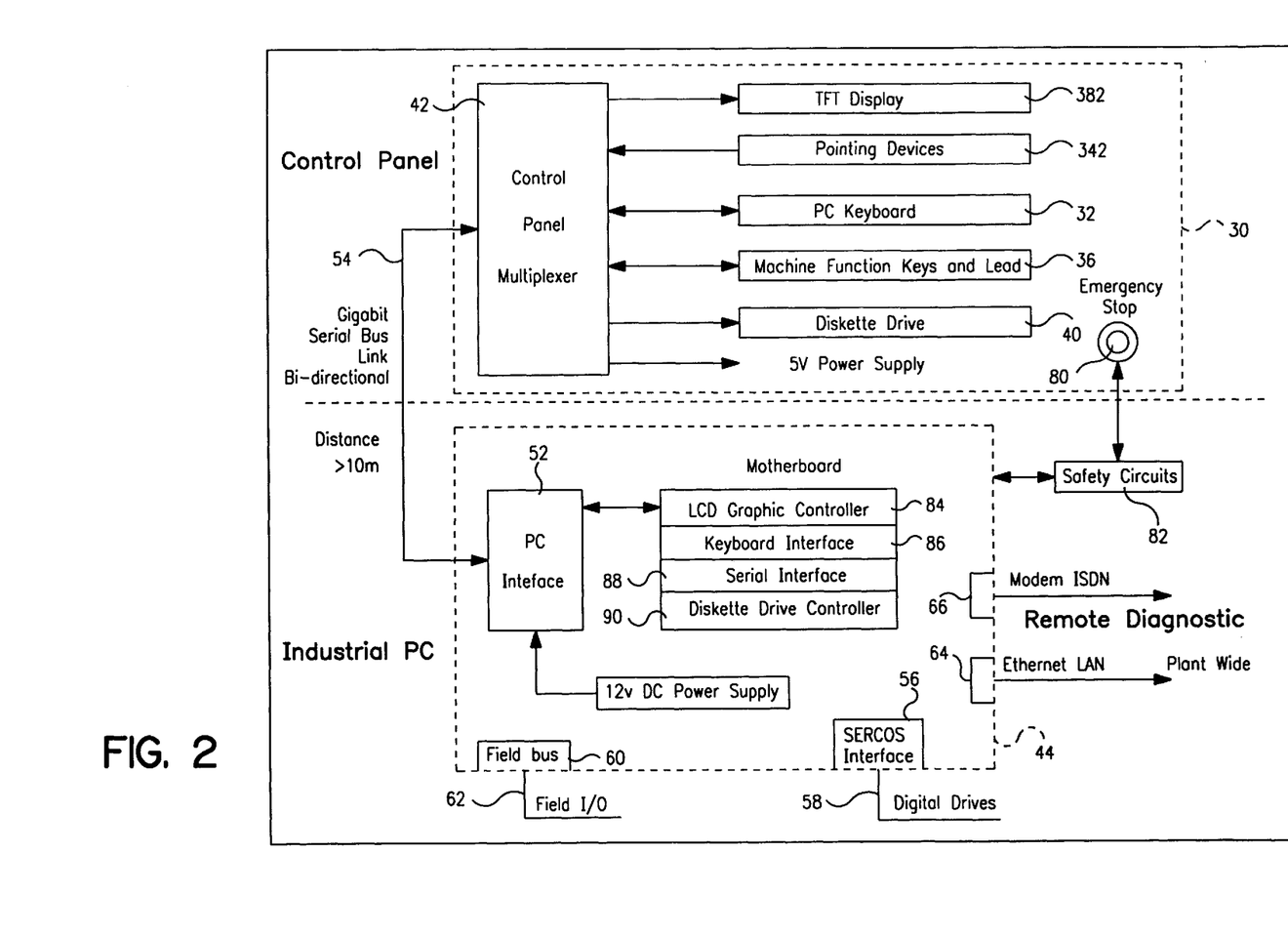
FIG. 2 is a schematic block diagram of both the human machine interface and the general purpose computer according to the present invention.

Referring to FIG. 2, the HMI 30 is shown connected to the computer 441 through the greater than 1 Gigabit serial bus link 54. The use of such a high speed bi-directional multiplexed bus between the HMI 30 and the computer 44 allows the physical separation of the operator control and the display elements from the computer 44. In the preferred embodiment, the link 54 is as long as 50 meters, although lesser lengths such as 10 meters may be appropriate. By housing the computer 44 away from the HMI 30, all delicate computer devices such as hard disk drives, modems, the CPU, etc. can be protected from the heat, vibrations, and impacts normally encountered in an injection molding environment. This high-speed link enables the HMI 30 to be installed near the machine 10 and at an optimum location for ease of operation while maintaining a sufficient separation from the computer 44. For this reason, the electronics residing inside the HMI should be the minimum required to display data, allow data input, and facilitate manual command functions through the keyboard 32, the pointing device 34, and the function keypad 36.

In FIG. 2, the display at the HMI is preferably a TFT display 382, although the display may be an LED, an LCD, a CRT, or other equivalent display devices. The HMI 30 also includes one or more pointing devices 342 which may comprise a mouse, light pens, a touch screen devices, etc. The keyboard 32 is, preferably, a standard PC keyboard, although specialized keyboards with specialized function keys may be used. The machine function keys and LED display 36 are those typically found in known injection molding systems. The removable storage device 40 is used to input control program or setpoint information, or to store feedback signals. The above-discussed input and output devices are connected to the HMI multiplexer 42 which multiplexes the information for transmission over the greater than 1 Gigabit serial bus link 54. The multiplexer 42 also controls a 5 volt power supply (not shown). Lastly, the HMI 30 may include an emergency stop button or device 80 which may be used to stop the injection molding devices in an emergency. The emergency stop button 80 is connected to safety circuits 82 which, in turn, are connected to the computer 44 through an interface (not shown).

The link 54 provides bi-directional communication between the HMI and the computer 44, and this greatly simplifies the architecture and improves the reliability of the system. The bi-directional link 54 connects the HMI 30 to the computer 44 for video control and data input. The computer 44 thus processes the bulk of HMI information instead of the HMI 30. The speed of communication between the HMI 30 and the computer 40 is in the Gigabit/s range, and this allows the computer 44 to provide real-time response from operator-initiated changes to the machine devices 12–22. The link 54 can be implemented by commercially-available links such as PanelLink, products based on an international industrial standard such as IEEE P1349b, or CP-Link from Beckhoff Industrial Electronics, or equivalents. In the preferred embodiment, the CP-Link from Beckhoff is used.

The HMI 30 thus has minimum processing capability, preferably only those required to display data, allow data input, facilitate manually-controlled functions through the function keys 36, and to communicate with the operator through graphic, text, and video display. Since the computer 44 can be housed away from the HMI 30 (e.g., in a control cabinet) in a controlled environment to protect the delicate computer devices, the operator control and display functions can be moved closer to the injection molding system for closer observation of machine functions by the operator.

The bi-directional link 54 may comprise a two wire coaxial cable, two single wire coaxial cables, one or more fiber optic cables, or other communication means. No additional power supply is usually needed for the link 54. The cable interface may comprise a printed circuit board connected to a standard personal computer bus (e.g., ISA, or PCI), and therefore may be used with any general purpose computer.

As shown in FIG. 2, the computer 44 may include additional structure to that depicted in FIG. 1. In particular, the computer 44 preferably also includes an LCD graphics controller board 84 for controlling the display 382. Preferably, the controller 84 includes an LCD interface. The computer 44 also includes a keyboard interface 86 for keyboard 32, and a removable storage device controller 90, which controls the removable storage device 40. The serial interface 88 is used to control the serial communication ports.

Signals from the computer interfaces for the LCD, the keyboard, the pointing devices, the communication ports, and the removable storage devices are converted by the PC interface link board 52 to a high frequency serial signal which is then transferred to the HMI 30 through the link 54. The HMI multiplexer 42 converts the serial signal back to the original computer interface-generated signals, which are then transmitted to the various devices for control and feedback. Thus, the devices on the HMI 30 may be controlled from the computer 44 over much longer distances than would normally be possible. Since the link 54 preferably has at least two separate channels, there is a link channel for each communication direction between the control panel 30 and the computer 44.

The computer 44 also includes an interface 56 for interfacing directly, when required, to digital devices 16 and 18 over the digital bus 26, as seen in FIG. 1. Preferably, the interface 56 is a SERCOS (Serial Real-time Communication System). Again, the open architecture of the computer 44 allows control of injection molding devices 16 and 18 directly through the digital bus 26 or, alternatively, through the fieldbus 24.

6. Fieldbus

In FIG. 1, the computer 44 interfaces with digital injecting molding devices 12, 14, and analog injection molding devices 20, 22 through the fieldbus 24. Preferably, the fieldbus 24 is a standard industrial fieldbus, such as a CANopen bus, a Lightbus, an Interbus, a ControlNet bus, a Profibus DP/FMS, or an equivalent device. The Profibus DP operating at 12 MBit/s is used in the preferred embodiment. As noted above, the computer 44 may also use a digital bus 26 (preferably SERCOS) to interface to digital servo drives and other digital devices 16, 18.

The integration of inputs from the injection molding devices, sensors, and control outputs for actuators and digital drives is achieved by an open device network interface of the computer 44. The control platform of the computer 44 supports all major device fieldbuses. The use of an industrial-grade fieldbus with a high-speed multiplexed signal bus, operating under fault tolerant protocol, replaces the multiple dedicated wires used in the prior art. This eliminates the cost and reliability problems associated with dedicated wiring. The interface protocol of the fieldbus is preferably implemented using microcontrollers. Such microcontrollers can directly take care of unwanted effects such as signal noise, and can also perform a feasibility check of the commands. Additionally, integrating a fieldbus interface with a dedicated controller provides so-called "control islands". Control islands comprise dedicated inputs/outputs and localized processing capabilities to achieve a distributed control architecture that pushes the controller closer to the system being controlled by moving intelligence and responsibility closer to the network edge. The ability to solve problems locally reduces the traffic burden on the network backbone (i.e., the CPU in the computer 44). As injection system functions can be partitioned into application specific sub-systems with well-defined and clustered control elements, the use of control islands to provide the control of the sub-system greatly enhances the modularity and performance of the control system. The control islands are connected to the system controller through physical fieldbus connections. These connections provide logical connection, messages; both loosely coupled to provide scalability of the control system.

7. Control Software

Figure 3:
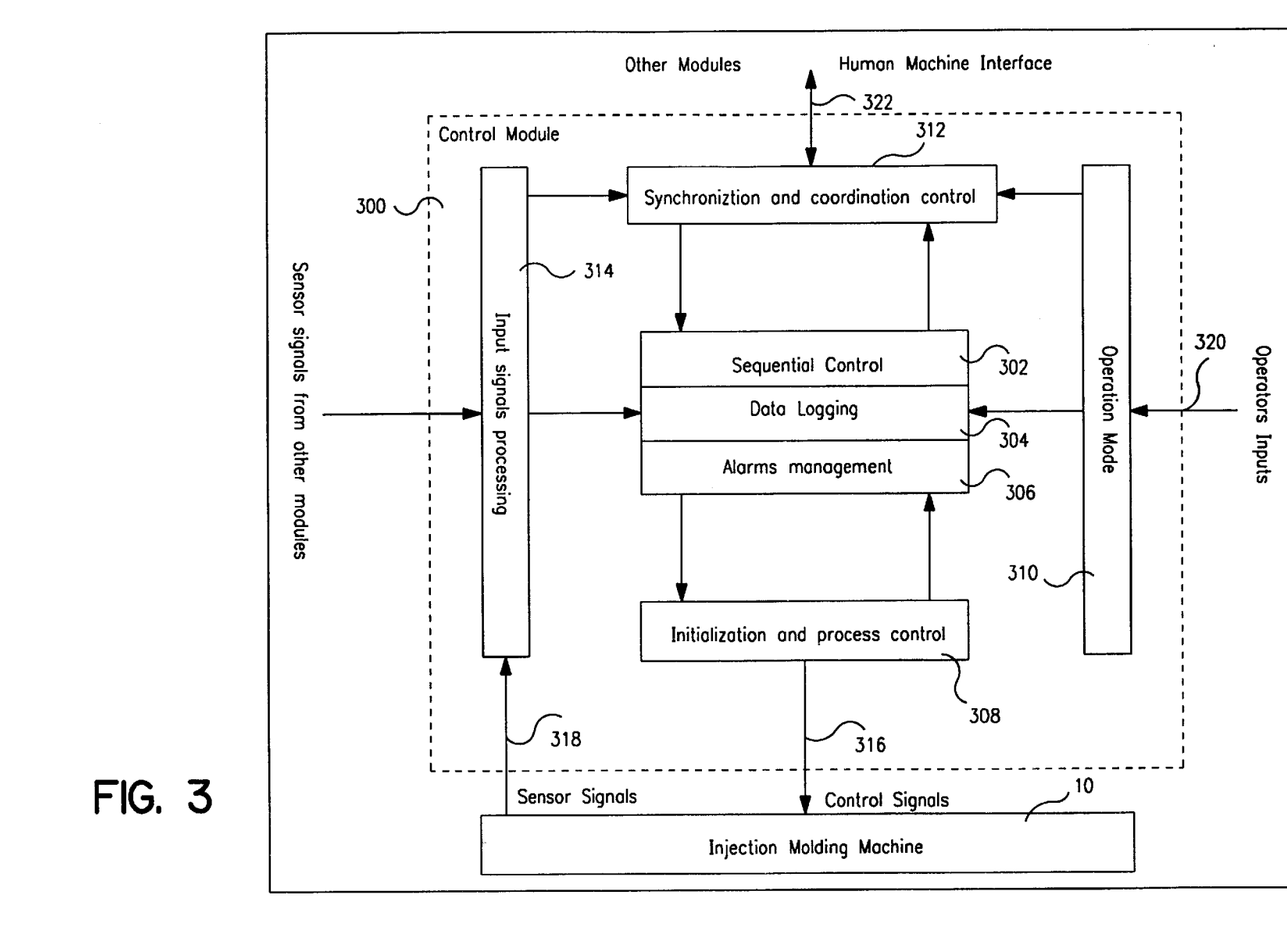
FIG. 3 is a schematic diagram of the software control module in accordance with the present invention.

FIG. 3 is a view of the preferred control software module according to the present invention. FIG. 3 is in the form of a functional block diagram of the software control architecture used in the computer 44. In FIG. 3, the control software 300 includes a software module for sequential control 302, a software module for data logging 304, and a software module for alarm management 306 (to be described below). Interfacing with the above-three software modules are an initialization and process control module 308, an operation mode module 310, a synchronization and coordination control module 312, and an input signals processing module 314. The initialization and process control module 308 sends control signals 316 to the injection molding system 10, while sensor signals 318 from the injection molding system 10 are provided to the input signals processing module 314. The module 314 also receives sensor signals from other software control modules (not shown).

Operator inputs 320 from the HMI 30 are provided to the operation mode module 310, which provides inputs to the modules 302, 3C4, and 306. Other HMI interface signals 322 are provided to the synchronization and coordination control module 312, which also interfaces with the modules 302, 304, and 306. This software control architecture provides great flexibility for upgrading and/or modifying the existing software.

Figure 4:
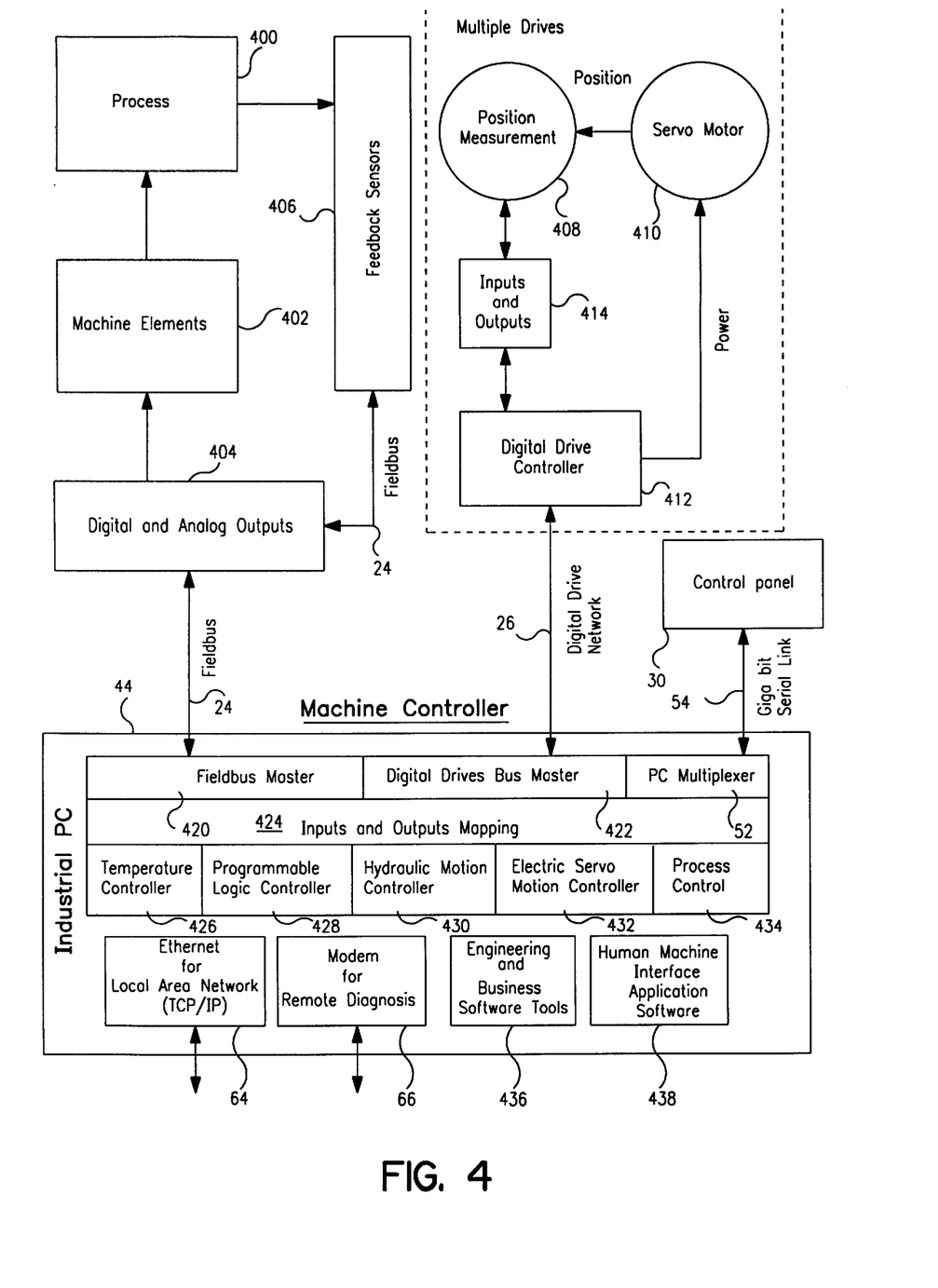
FIG. 4 is a schematic view of the control architecture according to the present invention.

FIG. 4 is a functional block diagram of the control architecture according to the present invention. In FIG. 4, the injection molding process 400 utilizes the injection molding system 10 to perform injection molding operations. The injection system elements 402 comprise the devices 12–22 which are driven by digital and analog outputs 404 received over the fieldbus 24. The feedback sensors 406 associated with the machine elements 402 provide digital and analog feedback signals through the fieldbus 24.

Position measurement device or devices 408 provides measurement of the actual position of the process and is driven by a servomotor 410 which receives controlled power from digital drive controller 412. Inputs and outputs 414 are coupled with the position measurement device or devices 408 and the information is transmitted to the digital drive controller 412 which transmits signals to/from the computer 44 over the digital bus 26.

The computer 44 communicates digital and analog signals over the fieldbus 24 through a fieldbus master 420. Likewise, the computer 44 communicates digital signals over the digital drive 26 through a digital bus drive master 422. Signals communicated to/from the HMI 30 are transmitted over the link 54 through the interface 52, such as a PC multiplexer. The computer 44 includes software-based programs which carry out functions for: inputs and outputs mapping 424; temperature control 426; programmable logic control 428; hydro-mechanical motion control 430; electro-mechanical motion control 432; and process control 434. Furthermore, the computer 44 may include other software-based functions such as engineering and business software tools 436 and HMI application software 438.

The control software, control programs, HMI programs, and other software may be loaded into the computer 44 from computer-readable storage medium or media such as disks, CD ROM's, tapes, magnetic-optical disks, etc., or remotely through the LAN or internet connections.

The control architecture depicted in FIG. 4 integrates real-time commands, programmed commands, and manual commands. Since it features a general purpose computer with an open architecture, modifications and upgrades to all of these commands can be conveniently input. The real-time kernel running in the general purpose operating system provides real-time injection molding system control interlaced with programmed and manual inputs in multi-tasking processing. The real-time kernel provides high priority for the system control and a window for processing the general purpose information.

The control architecture includes multiple levels which process under the multi-tasking scheduler of the kernel, with each level itself performing its specific functions. The real-time closed loop system control and the real-time high speed switching in response to system element feedback signals are executed at the highest priority, along with emergency stop and ordered shut-down functions. Software provides the function of a programmable logic controller to control the system operations sequence. The same computer, in the background level, performs the HMI functions, although the speed of communications and the processing power of the computer will allow the HMI functions to be performed virtually in real time. A common database is shared between the machine control functions and the HMI functions to improve the throughput of the information processing by eliminating the multiple-processor bottleneck imposed by the prior art.

The general purpose computer is capable of interfacing with a wide variety of peripheral devices such as a CD ROM, a modem for intranet/internet or remote connectivity, and a local area network such as Ethernet for plant-wide communications. Thus, a single computer performs the functions of closed-loop control of the injection molding system, sending commands and status either locally via the installed system devices or remotely via communication means to/from other sites, receiving input data from the HMI or from network-connected clients, and controlling displays at the HMI.

8. Additional Capabilities

Since the general purpose computer has a great deal of processing power, it can also provide additional capabilities useful in an injection molding environment. For example, the general purpose computer can perform smart filtering of information, provide an expert system to improve the process set-up and operation, and provide an alarm management system.

Smart filtering is a processing technique to selectively filter signals processed by the CPU to limit information overload at the high-priority multi-tasking processing levels. It is the process of selecting levels of information for further processing of data. Non-critical data is excluded from the system as the level of network management rises, so that the top network management consoles can concentrate on higher-level concerns like trend analysis and capacity planning. This also reduces the burden on the network and improves the communication throughput in the entire network. The general purpose computer of the present invention can include such smart filtering processing so that predetermined system-level signals need not be transmitted through the network.

The high processing power of the single general purpose computer according to the present invention enables it to be used in an expert system to manage the injection molding system. Such an expert system adds value to the alarm management system (to be discussed below) by diagnosing process disruptions, generating more precise operator information, and assisting in implementation of corrective actions (such as reconfiguring the system "on the fly"). This results in a more robust alarm management system to help operators manage process disruptions safely and efficiently, and minimize system down time. The expert system can also add value to process set-up by providing the operator with the recommended process parameters based on knowledge specific to that system stored in the computer memory. The computer can also archive material information for its associated mold, or it can store this information in a remote location through the intranet/internet access.

Expert systems are applications of artificial intelligence that apply an inference engine, fuzzy logic technologies and/or other methods to reason, in real-time, about events that occur in dynamic processes such as those used in injection molding. The inference engine reasons about specific predetermined rules defined in a knowledge base that is derived from empirical data and operator input.

The use of the general purpose computer in a real-time expert system in accordance with the present invention can be used in at least two ways, as an advisory system and as a supervisory control system. In advisory applications, the expert system reasons about dynamic changes in process data, makes decisions based on process events, and presents conclusions and a rationale to the operator. The expert system thus provides timely and accurate advice to the operator concerning process occurrences and impending problems. In the supervisory control applications, the expert system according to the present invention pro-actively assists operators by adjusting set points and switching discrete equipment on or off to resolve problems, optimize molding operations, or achieve other objectives defined in the knowledge base, such as predictive maintenance. It is the high processing power of the general purpose computer according to the present invention which provides the opportunity to realize an expert system in an injection molding environment.

Many injection molding systems have an alarm system that alerts the operator of system malfunctions and may also execute a system function set such a stepped shutdown, slowdown, etc. The single general purpose computer according to the present invention has enough processing power to allow the computer to manage an intelligent alarm system, i.e., an alarm system that reasons about the state of alarms. This allows the computer or the user to apply a higher level of logic to the system functions so that the system is not simply shut down with the subsequent impacts on system performance and productivity. That is, the computer may continue to operate the injection molding system, but at a lower rate, if alarm analysis indicates only minor difficulties such as a slightly higher temperature.

The intelligent alarm system according to the present invention can thus accurately capture the dynamic changes occurring in the injection molding system during different alarm conditions. For example, the system can be automatically controlled to stop or merely produce at a lower rate; or the operator can be prompted to input additional data to correct the condition which generated the alarm. Moreover, if additional information on an alarm condition is required by the computer, the operator can input such data at the HMI based on the feedback information presented on the display. The operator can also consult an on-line operating manual (stored in the computer memory) to provide timely corrective information for the alarm condition. Such alarm management information can be made available to the operator in text, graphic, audio, and even video forms.

The intelligent alarm management system according to the present invention can provide predetermined actions for any conditions such as alarm activation, alarm acknowledgement, and alarm cessation. Actions may range from a simple advisory text message, to paging an operator in the factory, or sending electronic mail to the maintenance department, the plant supervisor, or other engineering personnel through a network.

Since the computer according to the present invention may include a general-purpose operating system, the real-time or stored feedback signals can be used in off-the-shelf business applications software, such as spreadsheets or relational database management. Thus, statistical process analysis and preventive or predictive maintenance functions may be accomplished by the computer of the present invention, or by another server coupled to the computer through the network. Also, since the computer of the present invention preferably adopts the open data communications standards known in the computer industry, this will eliminate the need for propriety drivers presently used in the injection molding industry. Even if certain manufacturers require proprietary drivers for certain injection molding devices, these drivers can be rapidly downloaded to the computer 44 through the internet and the modem 66.

Preferably, the computer according to the present invention includes a plurality of predetermined set-up programs (wizards) which walk the operator through set-up in an easy-to-understand fashion. For example, a series of pre-defined templates may be presented to the operator which allows options for selection in data fields for the input of the desired parameters for the particular system. Such wizards may be provided for each individual system or for an entire class of systems and may be upgraded through the internet or local network connection.

9. Conclusion

Thus, what has been described is a single, general-purpose computer for an injection molding system which eliminates the need for a programmable logic controller or an analog signal processor, multi-task processes the injection molding functions and the HMI functions, and provides open communications with a local area network and/or the internet. This is a powerful tool in improving the accuracy and productivity of the injection molding system itself, and also improving management access and control of the system operations.

Of course, other embodiments of the present invention may be conceived by those of skill in the art. For example, the general purpose computer of the present invention may control more than one injection molding system, or it may control an injection molding system and one or more ancillary machines such as a conveyor belt, a robot, or other product-handling equipment. The control of such machines may be integrated in the single processor of the present invention to provide a smooth flow of products through the factory.

Additionally, the HMI for each system does not have to be located immediately adjacent to that system. For example, a central control station may be provided with a plurality of control panels from a plurality of systems so that one operator can control a number of injection molding and ancillary machines. In this configuration, the general purpose computer may be located at the operator control station, or at a remote location. Extending this configuration, it can be seen that the computer 44 (or even the HMI's) may be located in the factory office so that management receives immediate operational information and can rapidly reconfigure injection molding operations.

What is claimed is:

1. Apparatus for controlling an injection molding system having a plurality of devices which generate a corresponding plurality of feedback signals, said apparatus comprising:
   a human machine interface having a display and at least one operator input device; and
   a general purpose computer directly coupled to both said human machine interface and to the plurality of injection molding devices, said general purpose computer multi-tasking:
      (i) real-time closed loop control of said plurality of injection molding devices based on the plurality of feedback signals; and
      (ii) human machine interface display.

2. Apparatus according to claim 1, wherein said general purpose computer performs real-time closed loop control of said plurality of injection molding devices based on data received from the operator input device.

3. Apparatus according to claim 1, wherein said general purpose computer performs multi-tasking processing of the closed loop control of said plurality of injection molding devices.

4. Apparatus according to claim 1, wherein said general purpose computer performs multi-tasking processing of (i) the closed loop control of said plurality of injection molding devices and (ii) data received from the operator input device or devices.

5. Apparatus according to claim 1, wherein said general purpose computer has an open architecture for running off-the-shelf software unrelated to the control of the injection molding machine.

6. Apparatus according to claim 1, wherein said general purpose computer has an interface for coupling said general purpose computer to at least one of a local area network and the internet.

7. Apparatus according to claim 1, wherein said general purpose computer performs the real-time closed loop control of said plurality of injection molding devices in the absence of an analog signal processor and a programmable logic controller.

8. Apparatus according to claim 1, wherein said general purpose computer is disposed remote from said operator control panel.

9. Apparatus according to claim 1, further comprising:
   a field bus connecting said general purpose computer to said plurality of injection molding devices; and
   a serial bus link connecting said general purpose computer to said operator control panel.

10. Apparatus according to claim 9, wherein said field bus comprises a high-speed multiplexed signal bus which carries said plurality of feedback signal to said general purpose computer, and carries real-time control signals from said general purpose computer to said plurality of injection molding devices.

11. Apparatus according to claim 9, wherein said serial bus comprises a bi-directional, gigabit serial bus capable of carrying multiplexed data between said general purpose computer and said operator control panel.

12. Apparatus according to claim 11, wherein said serial bus is more than about 10 meters long and operates at above about one gigabit per second.

13. Apparatus according to claim 1, wherein said general purpose computer performs smart filtering of said feedback signals, and performs alarm management based on the filtered feedback signals.

14. A single computer for controlling an injection molding system having (i) a plurality of injection molding devices which carry out injection molding processes and provide feedback signals, and (ii) a human machine interface having a display and at least one manual input device for inputting operator commands, said single computer comprising:
   a first input/output for receiving command signals from said human machine interface manual input device, and for providing display signals to the human machine interface display;
   a second input/output for receiving the feedback signals directly from the plurality of injection molding devices, and for providing real-time control signals directly to the plurality of injection molding devices; and
   a CPU for generating the real-time control signals in accordance with said feedback signals and said command signals, said CPU performing multi-masking processing of:
      (i) said command signals,
      (ii) said display signals,
      (iii) said feedback signals, and
      (iv) said control signals.

15. A computer according to claim 14, wherein said CPU performs said multi-tasking processing according to a predetermined priority of tasks.

16. A computer according to claim 15, wherein said CPU runs an off-the-shelf, real-time extension kernel to perform said multi-tasking processing.

17. A computer according to claim 14, wherein said CPU controls the plurality of injection molding devices in the absence of an analog signal processor.

18. A computer according to claim 14, wherein said CPU performs real-time closed loop control of the plurality of injection molding devices based on said feedback signals.

19. A computer according to claim 14, further comprising a third input/output for transferring injection molding signals to/from at least one of a local area network and the internet.

20. A computer according to claim 14, wherein said CPU has are open architecture capable of running off-the-shelf software unrelated to control of said plurality of injection molding devices.

21. An injection molding system comprising:
a plurality of injection molding devices for performing an injection molding operation, said plurality of injection molding devices receiving real-time control signals and outputting real-time feedback signals:
a human machine interface having a display and at least one operator input device; and
a single processor which (i) receives the real-time feedback signals from said plurality of injection molding devices and command signals from said at least one operator input device; (ii) multi-task processes the received signals in accordance with a plurality of predetermined injection molding control programs and display programs, (iii) outputs the real-time control signals to the plurality of injection molding devices and outputs display signals to the human machine interface display in accordance with the plurality of predetermined injection-molding control programs and display programs, and (iv) has an operating system which is capable of running commercial software.

22. A system according to claim 21, wherein said single processor has a Windows NT operating system and multi-task processes using an off-the-shelf real-time extension kernel.

23. A system according to claim 21, wherein said plurality of injection molding devices includes an analog device and a digital device, and wherein said single processor controls both said analog device and said signal device.

24. A system according to claim 21, wherein said processor is disposed remote from said control panel and said plurality of injection molding devices.

25. A system according to claim 21, wherein said single processor has an interface for transmitting/receiving signals to/from a remote processor.

26. A system according to claim 21, wherein said single processor performs real-time control of said plurality of injection molding devices and real-time control of said control panel display.

27. A method of controlling an injection molding system which has (i) a plurality of injection molding devices that perform injection molding processes and provide feedback signals, and (ii) a human machine interface with a display and at least one operator input device, comprising the steps of:
inputting to a single processor the feedback signals and signals from the operator input device; and
using said single processor to control, in real-time, both:
(i) said plurality of injection molding devices and
(ii) said human machine interface display.

28. A method according to claim 27, wherein said single processor performs multi-tasking processing of said feedback signals and signals from the operator input device.

29. A method according to claim 28, wherein said single processor has an open architecture capable of running commercial software.

30. A method according to claim 29, wherein said single processor performs multi-tasking processing using a real-time extension kernel.

31. A method according to claim 27, wherein said single processor controls both said plurality of injection molding devices and said control panel display in the absence of a programmable logic controller and an analog signal processor.

32. A method according to claim 27, wherein said single processor is disposed remote from said injection molding machine.

33. A method according to claim 32, wherein said single processor communicates with said control panel by multiplexing information over a gigabit serial bus.

34. A method according to claim 33, wherein said single processor communicates with said plurality of injection molding devices over a field bus having an error correction function.

35. A method according to claim 27, wherein said single processor performs close d loop control of said plurality of injection molding devices.

36. At least one storage medium for storing computer-readable data which causes a single general purpose computer to control (i) an injection molding system having a plurality of injection molding devices that perform injection molding operations and produce a plurality of feedback signals, and (ii) a human machine interface having a display and an operator input device, said computer-readable data causing the single general purpose computer to:
receive the feedback signals and signals from the human machine interface operator input device; and
perform multi-task processing to control both:
(i) the plurality of injection molding devices and
(ii) the human machine interface in real-time, said multi-tasking processing performing human machine interface functions in background and injection molding device functions in foreground.

37. At least one storage medium according to claim 36, wherein said computer-readable data causes the single general purpose computer to perform closed loop control of said plurality of injection molding devices in the absence of a programmable logic controller and an analog signal processor.

38. At least one storage medium according to claim 36, wherein said computer-readable data causes the single general purpose computer to perform said multi-tasking processing using a commercial real-time extension kernel having a multi-tasking scheduler.

39. At least one storage medium according to claim 36, wherein said computer-readable data causes the single general purpose computer to perform error correction control of said feedback signals and the signals from the control panel operator input device.

40. At least one storage medium according to claim 36, wherein said computer-readable data causes the single general purpose computer to display, on said control panel display, data corresponding to said feedback signals.

41. At least one storage medium according to claim 36, wherein said computer-readable data causes the single gen eral purpose computer to store archival data corresponding to said feedback signals.

42. At least one storage medium according to claim 36, wherein said computer-readable data causes the single general purpose computer to receive data from and/or transmit data to at least one of a local area network and the internet.

43. At least one storage medium according to claim 36, wherein said computer-readable data causes the single general purpose computer to utilize fuzzy logic to control said plurality of injection molding devices.

* * * * *